United States Patent [19]
Sugahara et al.

[11] Patent Number: 5,745,218
[45] Date of Patent: Apr. 28, 1998

[54] PHOTOGRAPHIC PROCESSING SYSTEM

[75] Inventors: Koichi Sugahara; Tsutomu Kimura, both of Kanagawa, Japan

[73] Assignee: Fuji Photo Film Co., Ltd., Kanagawa, Japan

[21] Appl. No.: 665,875

[22] Filed: Jun. 19, 1996

[30] Foreign Application Priority Data

Jul. 10, 1995 [JP] Japan .................................... 7-173231

[51] Int. Cl.$^6$ ........................................ G03B 27/52
[52] U.S. Cl. ........................ 355/40; 355/77; 396/567; 396/578
[58] Field of Search .............................. 396/612, 622, 396/564; 355/38, 40, 41, 77, 27–29; 430/398–400, 568–570, 578

[56] References Cited

U.S. PATENT DOCUMENTS

| | | | |
|---|---|---|---|
| 4,975,732 | 12/1990 | Robinson et al. | 355/40 |
| 5,353,095 | 10/1994 | Terashita | 355/38 |
| 5,452,050 | 9/1995 | Ishikawa et al. | 355/27 |
| 5,508,783 | 4/1996 | Iwagaki et al. | 355/40 |
| 5,518,844 | 5/1996 | Matsumoto et al. | 396/567 |
| 5,574,533 | 11/1996 | Itoh | 396/639 |
| 5,576,794 | 11/1996 | DeMarti, Jr. et al. | 396/564 |

*Primary Examiner*—D. Rutledge
*Attorney, Agent, or Firm*—Sughrue, Mion, Zinn, Macpeak & Seas, PLLC

[57] ABSTRACT

A photographic processing system prints images from photographic films onto photographic printing paper and comprises: a film setting section for setting exposure conditions by which the images are printed onto photographic printing paper, a storage section for storing the exposure conditions for respective images recorded on the film, an exposure condition setting section for setting exposure conditions of the images of the photographic film when photographic prints corresponding to the images recorded on the film are reprinted, and a printing section which is responsive to the film setting section or the exposure condition setting section to print images based on the exposure conditions.

29 Claims, 13 Drawing Sheets

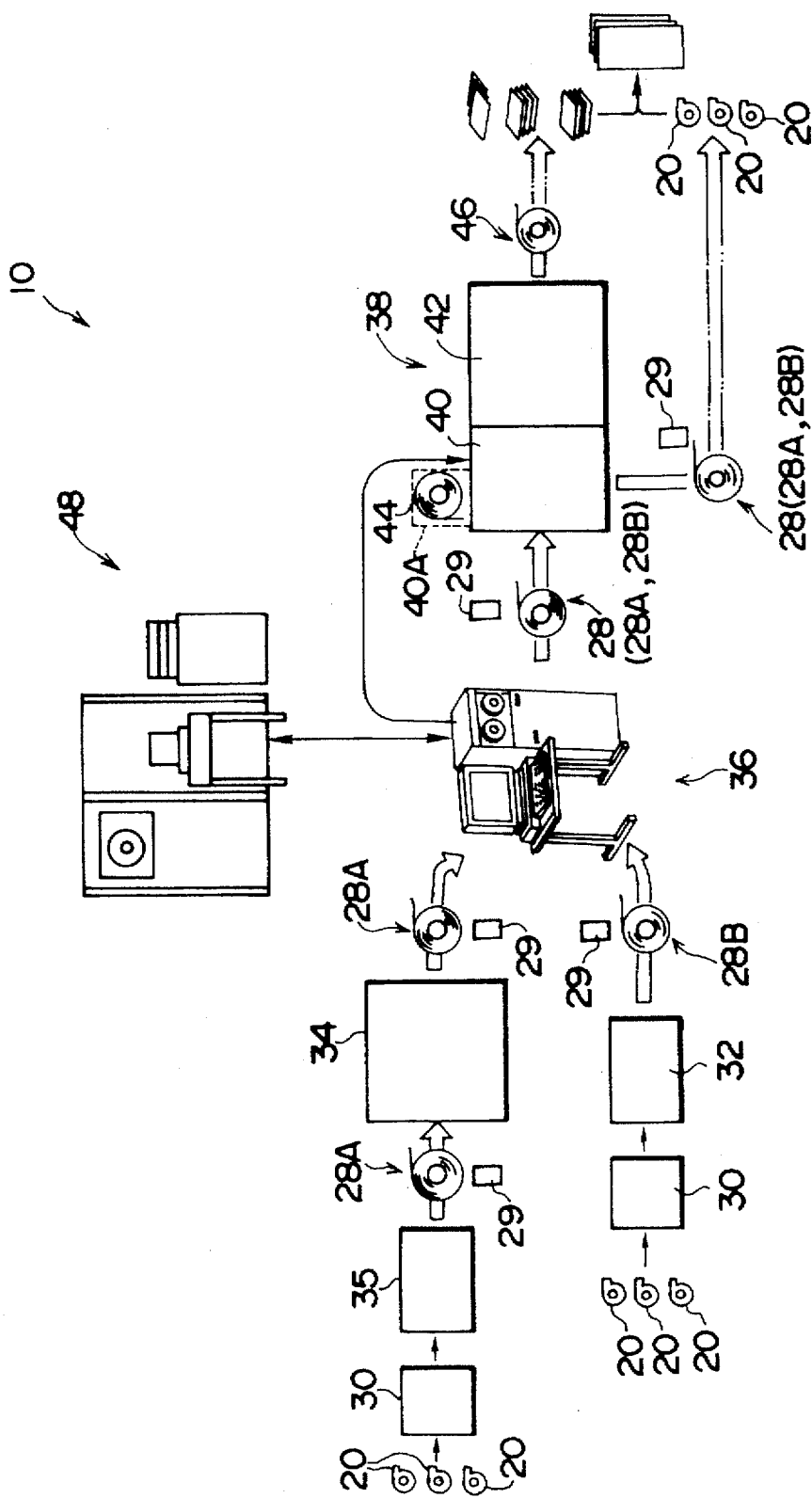

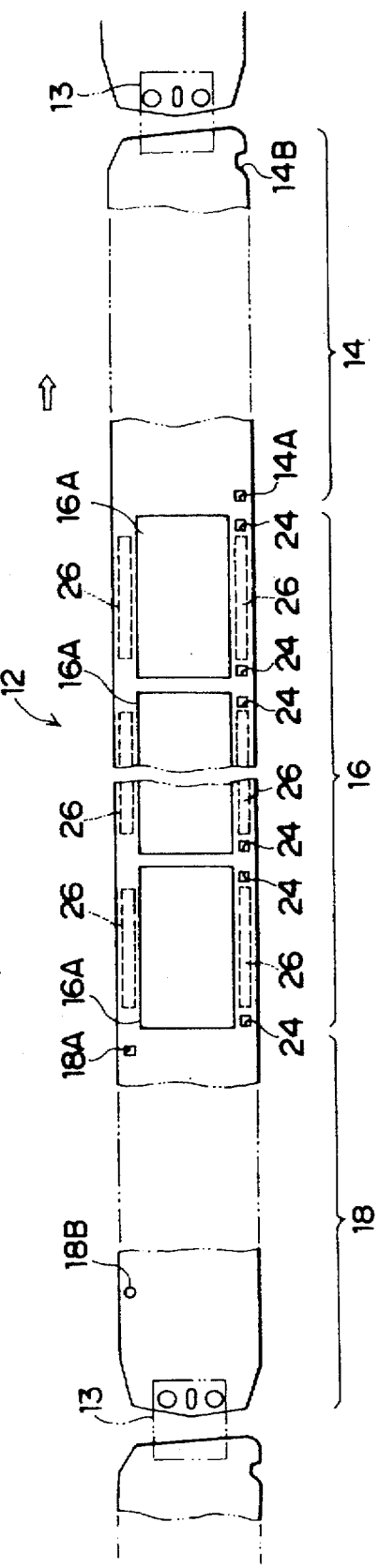
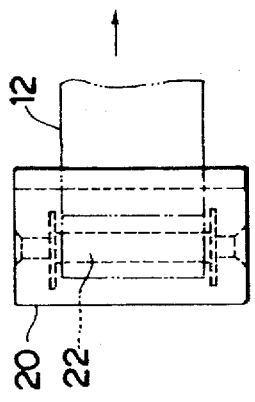
FIG. 2A
FIG. 2B

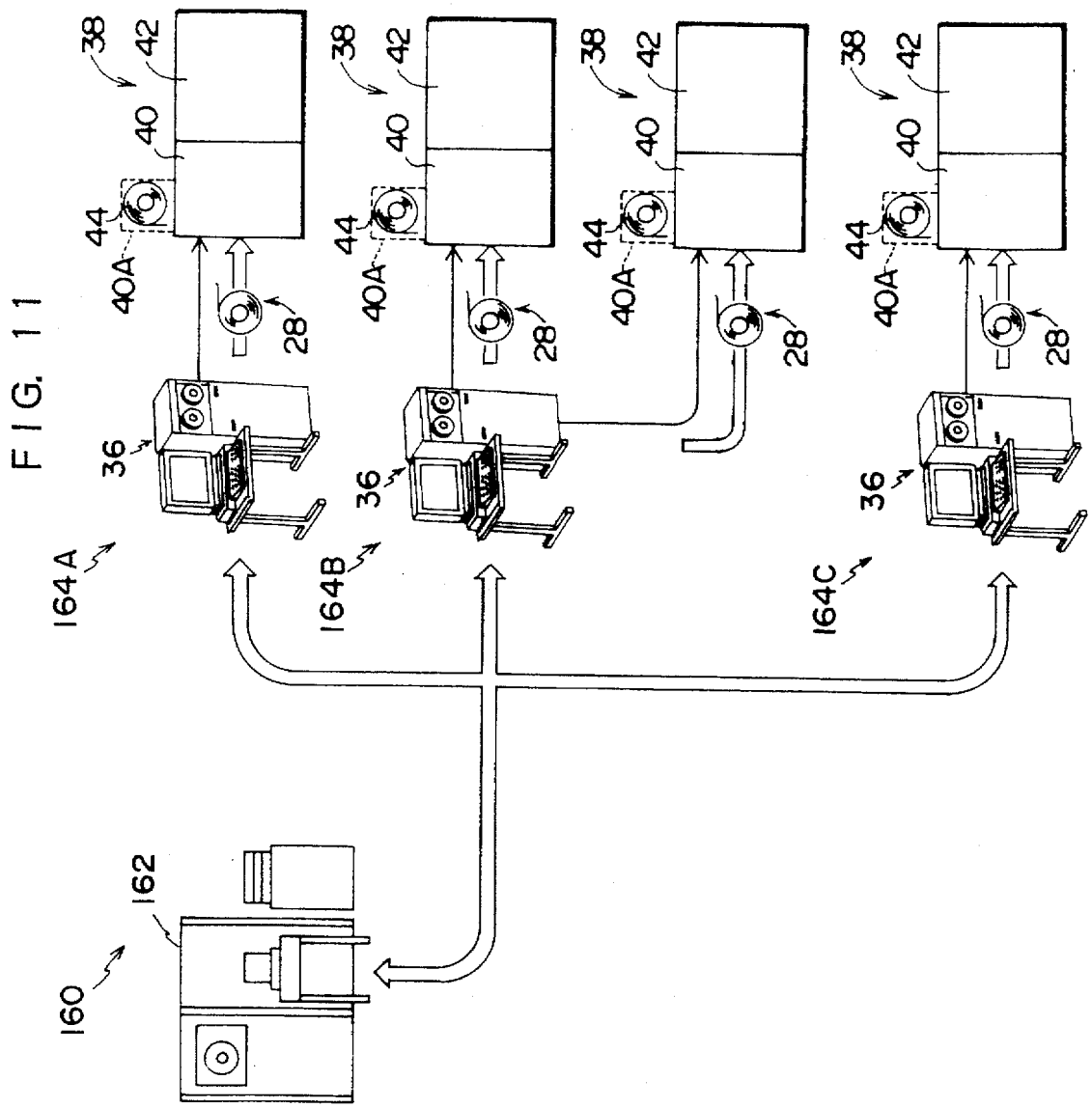

PHOTOGRAPHIC PROCESSING SYSTEM

BACKGROUND OF THE INVENTION

1. Field of the Invention

The present invention relates to a photographic processing system for printing images recorded on photographic films onto photographic printing papers or the like to form photographic prints.

2. Description of the Related Art

In general, a photographic film (hereinafter called "negative film") whose images have been subjected to exposure by photography or the like, is placed in a DP bag (i.e., a bag used to perform the transfer of the film between a DPE shop and a customer) in a state in which the film has been held in a film cartridge, and delivered to a laboratory. In a large-scaled laboratory (large integrated laboratory), the negative film is pulled out from the cartridge and subjected to development. Thereafter, a film inspecting or setting device sets and corrects an exposure condition while confirming images recorded in respective image frames and prints the images recorded on the negative film onto photographic printing papers or the like based on the exposure condition, whereby photographic prints corresponding to the images recorded on the negative film are prepared (simultaneous prints). The developed negative film and the formed photographic prints are placed in the DP bag again and returned to the customer.

On the other hand, the developed negative film has heretofore been returned to the customer as pieces of negatives cut every six image frames, for example. In contrast to this, a system has been proposed wherein a negative film is wound onto a cartridge again without cutting it and returned to a customer and various information (such as magnetic information) about the time of photography, etc., can be recorded on the negative film.

When it is desired to prepare photographic prints associated with the images recorded on the negative film returned to the customer, i.e., when the photographic prints are re-ordered, a DPE shop places the negative film in a DP bag and requests that a laboratory prepares additional prints. When the additional prints are printed, exposure conditions associated with images for creating the additional prints are set by a film setting device or the like, followed by printing of the images onto a photographic printing paper.

Since, however, a process for setting the exposure conditions is re-performed upon the reorder of extra prints in a manner similar to the simultaneous print, there may be cases where even in the case of the same images, the reprints are printed onto photographic printing papers under different exposure conditions. Thus, a problem arises that even in the case of images formed from the same negative film, photographic prints formed at the time of the simultaneous print are different in finish from photographic prints formed at the time of the extra print.

SUMMARY OF THE INVENTION

With the foregoing in view, it is therefore an object of the present invention to provide a photographic processing system capable of providing photographic prints having the same finish quality as that produced at the time of a simultaneous print even at the time of production of an extra print.

According to a first aspect of the present invention, there is provided a photographic processing system for printing images which have been recorded on photographic films onto photographic printing papers to form photographic prints, comprising:

a film setting section for setting exposure conditions under which the images recorded on each photographic film are printed onto the photographic printing papers;

a print section for printing the images on the photographic film onto the photographic printing papers based on the exposure conditions set by the film setting section;

a storage section for storing therein the exposure conditions for the respective images on each photographic film, which have been set by the film setting section; and an exposure condition setting section for setting the exposure conditions stored in the storage section, which have been set by the film setting section, as exposure conditions for the images on each photographic film when photographic prints corresponding to images on each photographic film are re-ordered.

According to the first aspect of the present invention, the exposure conditions for the images on the photographic films, which have been set by the film setting section, are stored in the storage section. When the photographic prints associated with the images on each photographic film are ordered again, the exposure conditions stored in the storage section are set as the exposure conditions for the images on the corresponding photographic film.

Thus, the re-ordered photographic prints can be printed on photographic printing papers under the same exposure conditions as those for the previously-formed photographic prints. Therefore, there is no difference in finish between each photographic print formed previously and each photographic print formed at a later time.

According to a second aspect of the present invention, there is provided a photographic processing system for printing images recorded on photographic films onto photographic printing papers to form photographic prints, comprising:

a film processing section for subjecting photographic films, on which images have been photographed, to development processing;

a film setting section for setting exposure conditions under which the images recorded on each photographic film are printed onto the photographic printing papers;

a print section for printing the images on the photographic film onto the photographic printing papers based on the exposure conditions set by the film setting section;

a storage section for storing therein exposure conditions for respective images on each photographic film processed for development by the film processing section when the exposure conditions for the respective images have been set by the film setting section; and an exposure condition setting section for setting the exposure conditions stored in the storage section, which have been set by the film setting section, as exposure conditions for the images of each photographic film when photographic prints corresponding to the images on each photographic film are re-ordered.

According to the second aspect of the present invention, the exposure conditions at the time of a simultaneous print for performing a print process on each photographic film after the photographic film has been processed by the film processing section, are stored in the storage section. Therefore, photographic prints can be formed under the exposure conditions at the time of the simultaneous print at all times upon an extra print when the photographic prints associated with the images on each photographic film have been re-ordered, whereby the photographic prints which have been finished in predetermined quality, can be provided.

When the exposure conditions corresponding to the images on each photographic film are stored in the storage section, it is preferable to store a code for specifying each photographic film therein together with the time (e.g., "date" or "date and time") of processing and record the processed date on each photographic film. Thus, the exposure conditions can be stored in the storage section in order of processing the photographic films and the exposure conditions can be searched based on the processed date recorded on each photographic film, whereby the efficiency of work at the time of retrieval and setting of the exposure conditions can be improved.

According to a third aspect of the present invention, there is provided a photographic processing system wherein the storage section according to the first aspect of the present invention is connected to a plurality of the film setting sections whereby a network is formed.

According to the third aspect of the present invention, the plurality of film setting sections are connected to the storage section so as to configure a network (data network) of photographic processing systems respectively provided with the film setting sections. Thus, if the photographic films, which have been subjected to a simultaneous print process or an extra-print process by any of the photographic processing systems in the network are used, then they can be finished in the same quality as that of the previous photographic prints upon the next extra-print process. Even if the photographic films are processed by any of the photographic processing systems that constitute the network, there is no difference in finish between the present photographic film and the previous photographic film.

According to a fourth aspect of the present invention, there is provided a photographic processing system wherein in the first aspect of the present invention, the storage section is a recording layer provided on each photographic film, the recording layer is recorded by magnetism, the film setting section has a reading member for reading the exposure condition which has been recorded on the recording layer and a recording member for recording the exposure condition on the recording layer, and the reading member is a magnetic reading member and the recording member is a magnetic recording member.

According to the fourth aspect of the present invention, the exposure condition set by the film setting section is recorded on the recording layer of the photographic film, which has been recorded by the magnetism, by the magnetic recording member. When an extra-print process is effected on the photographic film, the exposure condition recorded on the magnetic recording layer is read by the magnetic reading member. Thus, photographic prints can be formed under the same exposure condition as that at the time of the previous print. Since the exposure condition is recorded on each photographic film at this time, it is unnecessary to collectively store exposure conditions for a large number of photographic films. Thus, the photographic processing system capable of subjecting images to exposure under the same exposure condition as that at the time of the previous print upon the extra print, can be simplified in structure.

In the photographic processing system of the present invention, as has been described above, since each exposure condition set by the film setting section is stored in the storage section, the photographic prints printed under the same exposure condition as that at the time of the previous or simultaneous print upon the extra print can be obtained.

In the present invention as well, since the plurality of photographic processing systems are connected to one another by the network so as to collectively store the exposure conditions for the photographic films, photographic prints identical in finish to the previous ones can be obtained from any photographic processing system in the network. Further, an excellent effect can be brought about that since the recording layer of the photographic film, which has been recorded by the magnetism, is used as the storage section, photographic prints of the same finish quality can be formed from images on the same photographic film without collectively recording exposure conditions for a large number of photographic films.

The above and other objects, features and advantages of the present invention will become apparent from the following description and the appended claims, taken in conjunction with the accompanying drawings in which preferred embodiments of the present invention are shown by way of illustrative example.

BRIEF DESCRIPTION OF THE DRAWINGS

The present invention will be described with reference to the accompanying drawings in which:

FIG. 1 is a block diagram schematically showing the structure of a photographic processing system according to a first embodiment of the present invention;

FIG. 2A is a plan view schematically illustrating the structure of a negative film applied to the first embodiment shown in FIG. 1;

FIG. 2B is a schematic view showing a cartridge for holding the negative film shown in FIG. 2A therein;

FIG. 11 is a schematic view illustrating part of a photographic processing system according to a third embodiment of the present invention.

DETAILED DESCRIPTION OF THE PREFERRED EMBODIMENTS

Figure 3:
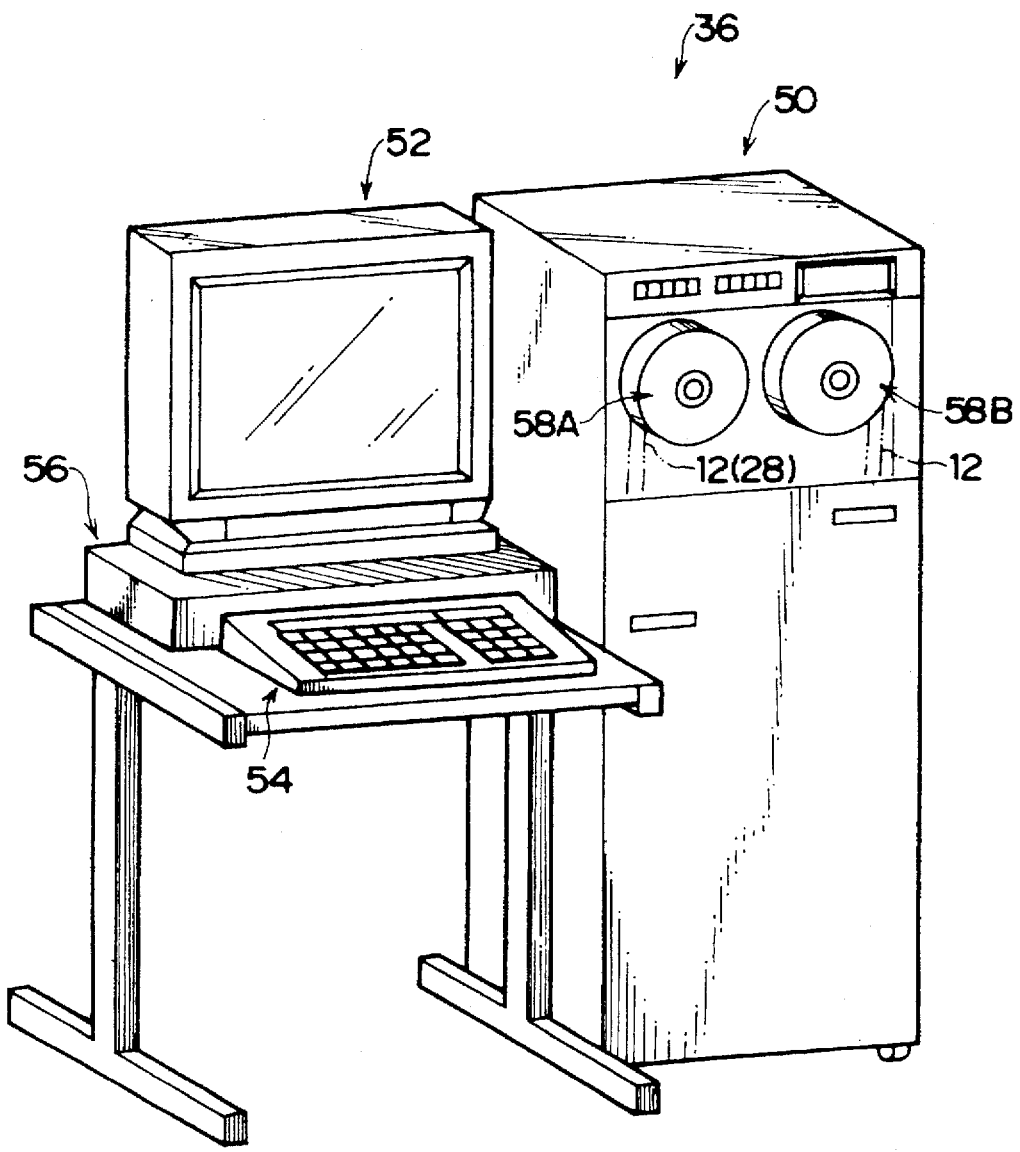
FIG. 3 is a schematic perspective view illustrating a scanner applied to the first embodiment as a film setting section.

A first embodiment of the present invention will hereinafter be described with reference to the accompanying drawings. FIG. 1 schematically illustrates the structure of a photographic processing system 10 placed in a large-scaled photo laboratory (large integrated laboratory). FIGS. 2A and 2B respectively schematically show the structure of a negative film 12 corresponding to one example of a photographic film processed by the photographic processing system 10.

As shown in FIG. 2A, the negative film 12 has an image recording portion 16 for recording images thereon by photography or the like, which is provided between a leader 14 and a tail 18 disposed at the ends of the recording portion and extending in the longitudinal direction of the negative film 12. The tail 18 of the negative film 12 is engaged with a spool spindle or shaft 22 of a cartridge 20 so as to be wound thereon (see FIG. 2B), so that the negative film is accommodated and stored within the cartridge 20.

The image recording portion 16 of the negative film 12 has a plurality of perforations 24 defined in transversely-extending ends of the negative film at predetermined intervals. Images are respectively recorded in image frames 16A in agreement with the perforations 24. Further, a transparent magnetic recording layer is formed in the negative film 12. Regions, which do not extend over the image frames 16A at the transversely-extending ends of the negative film 12, are used as magnetic tracks 26. Various information such as information about the negative film 12, information (such as the date and hour of photography, photographing conditions) about the time of photography of images, etc. are respectively recorded on the magnetic tracks 26. A film ID hereinafter called "FID") for specifying the negative film 12 can be recorded as magnetic information.

Around perforations 14A and 18A for indicating the position of the image recording portion 16, a notch 14B indicative of the position of the leading end of the negative film 12 and a detach perforation 18B indicative of the position of the rear end of the negative film 12 are respectively defined in the negative film 12. A cartridge ID (hereinafter called "CID") is recorded on the cartridge 20 for accommodating the negative film 12 therein. The FID of the negative film 12 is normally set to the same code as that for the CID and is not recorded as the magnetic information. However, the FID may be formed as a latent image corresponding to optical information such as a bar code in advance. The FID can be read from the negative film 12 through an optical sensor or the like by subjecting the negative film 12 to development.

As shown in FIG. 1, detachers 30 for respectively pulling out negative films 12 from cartridges 20 and splicers 32 for connecting a large number of negative films 12 withdrawn from the cartridges 20 to one another with splice tapes 13 (see FIG. 2A) and winding the connected one in the form of a roll so as to form a negative roll are provided in the photographic processing system 10. Incidentally, non-developed negative films 12 to be subjected to a simultaneous print process and developed negative films 12 to be subjected to an extra-print process are respectively processed as different rolls so as to be formed as a negative roll 28A and a negative roll 28B. Incidentally, the negative films 12 will be treated as a negative roll 28 in the following description unless a particular distinction is drawn between the negative films 12.

The detacher 30 reads a CID for a cartridge 20 with negative films 12 held therein and writes the CID into an LSI card 29 together with a roll ID set for each negative roll 28. The LSI card 29 travels along individual steps together with the negative roll 28 and is finally used to be verified or checked against cartridges 20, photographic prints and negative films 12. When an FID can be read from the developed negative film 12 as optical information or magnetic information, the FID is recorded on the LSI card 29 associated with the negative roll 28B in place of the CID.

Parts (such as the date, the time and the like at the time of the simultaneous print process (development) of the negative film 12, which will be described later) of magnetic information recorded on the magnetic tracks 26 of the negative film 12 are also recorded on the LSI card 29 associated with the negative roll 28B.

Further, a film processor 34 for subjecting a non-developed negative film 12 to development is provided in the photographic processing system 10. The respective negative films 12 formed as the negative roll 28A are first subjected to development by the film processor 34.

The negative roll 28A, which has been subjected to development or the negative roll 28B for the developed negative films 12 are loaded in a scanner 36 provided as a film setting section. After images of respective image frames have been read into the scanner 36 and an exposure condition has been set, the negative roll is sent to a printer processor 38. The printer processor 38 comprises a printer section 40 and a processor section 42 integrally connected to each other. The negative roll 28 is loaded in the printer section 40.

A paper roll 44 formed by winding printing or photographic paper in roll form is held and loaded in a magazine 40A of the printer section 40. The printer section 40 prints images recorded on each negative film 12 onto photographic printing paper pulled out of the magazine 40A. Incidentally, the exposure condition set by the scanner 36 is recorded on the LSI card 29 and the exposure condition recorded thereon may be read by the printer section 40. In the photographic processing system 10, however, the exposure condition is outputted from the scanner 36 to the printer section 40.

The photographic printing paper on which the images have been printed by the printer section 40, is sent to the processor section 42 where the photographic printing paper is immersed into processing liquids such as a color developer, a bleaching fixer, a rinsing or washing liquid so as to be subjected to development, followed by being wound in roll form so as to form a print roll 46.

When the finished state of each image is inspected (i.e., when a print inspection is done), the print roll 46 is cut every image frames as photographic prints, which are sorted for each negative film 12. Negative rolls 28 in which the images of the respective negative films 12 have been printed, are separated for each item and wound around the spool shaft 22 of the original cartridge 20 by an unillustrated attacher so as to be held within the cartridge 20 (the above is not shown in the drawing). The cartridge 20 and the photographic prints are placed in a DP bag for each item and returned to a customer.

The scanner 36 is electrically connected to the printer section 40 of the printer processor 38 and a database server 48.

The scanner 36 will now be described with reference to FIGS. 3 through 7.

As shown in FIG. 3, the scanner 36 comprises a scanner body 50 in which negative rolls 28 are loaded, a display 52, a keyboard 54 and a computer 56 (processing terminal). The scanner body 50, the display 52 and the keyboard 54 are electrically connected to the computer 56.

Figure 4:
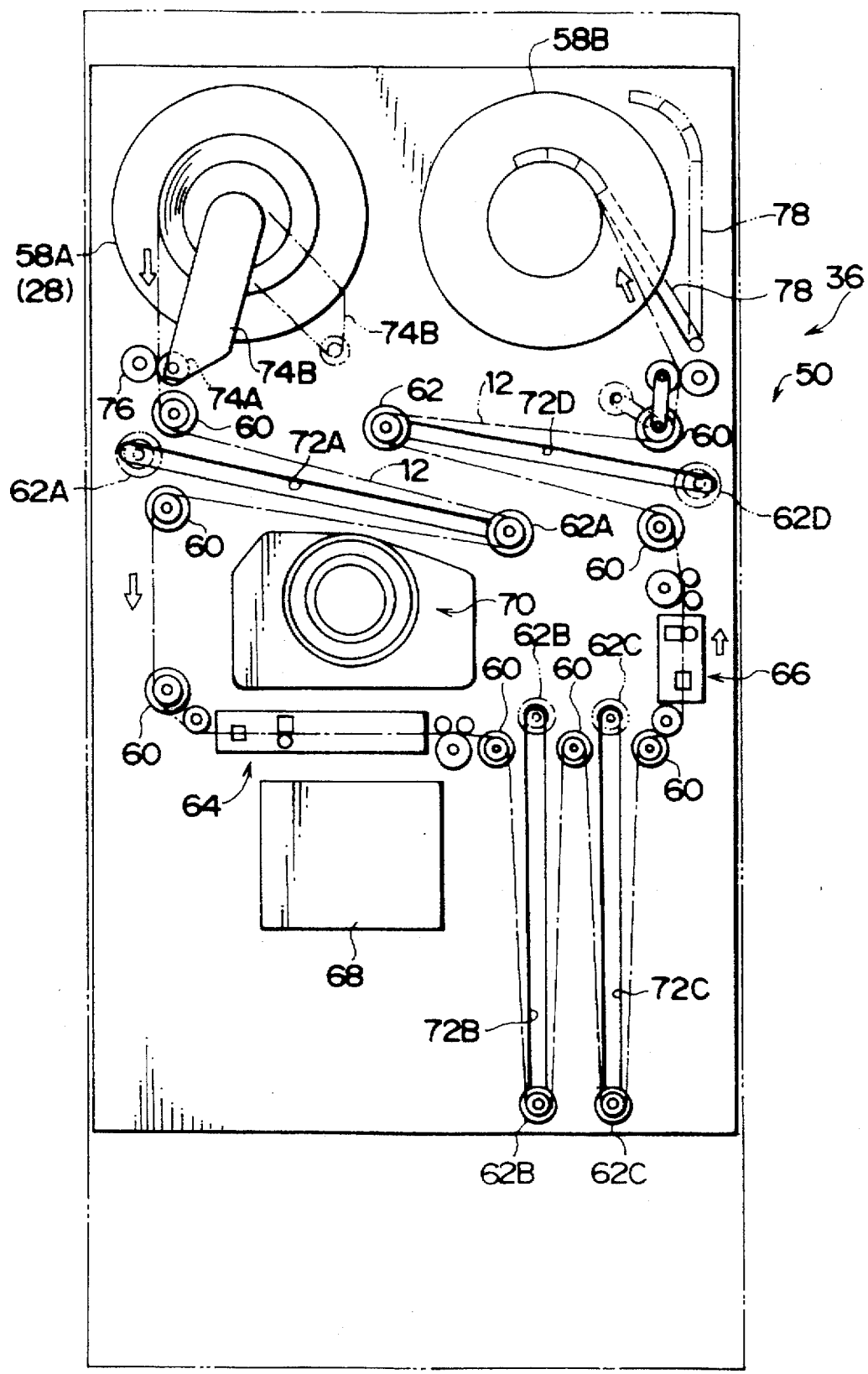
FIG. 4 is a schematic front view depicting a body of the scanner shown in FIG. 3.

As shown in FIG. 4, a reel 58A on which each negative film 12 is wound in roll form, and an empty reel 58B are attached to the scanner body 50. A conveying path for guiding and conveying the negative film 12 is defined between the reel 58A and the reel 58B by a plurality of guide rollers 60 and dance rollers 62A, 62B, 62C and 62D and the like. A film carrier 64 and a magnetic write section 66 are provided in the course of the path for conveying the negative film 12. Further, a light source section 68 and an image read section 70 are disposed with the film carrier 64 interposed therebetween.

The dance rollers 62A, 62B, 62C and 62D move within elongated holes 72A, 72B, 72C and 72D along their longitudinal directions. The dance rollers 62A, 62B, 62C and 62D absorb delivery and winding speeds of the reels 58A and 58B and the difference between speeds for conveying the negative film 12 at the film carrier 64 and the magnetic write section 66 while applying predetermined tensile forces to the negative film 12 upon conveying the negative film 12, so as to allow smooth conveying of the negative film 12.

The reel 58A includes an arm 74B provided with a press roller 74A at the leading end of the arm 74B. When the negative roll 28 is mounted onto the reel 58A, the arm 74B is turned to hold the leading end of the negative film 12 wound around the negative roll 28 between the press roller 74A and a roller 76 so as to pull out the negative film 12 from the reel 58A. Further, a guide arm 78 is provided in the vicinity of the empty reel 58B so as to guide the leading end of the negative film 12 withdrawn and conveyed from the reel 58A toward the peripheral surface of a take-up spindle of the reel 58B, whereby the negative film 12 is wound around the reel 58B.

Figure 5:
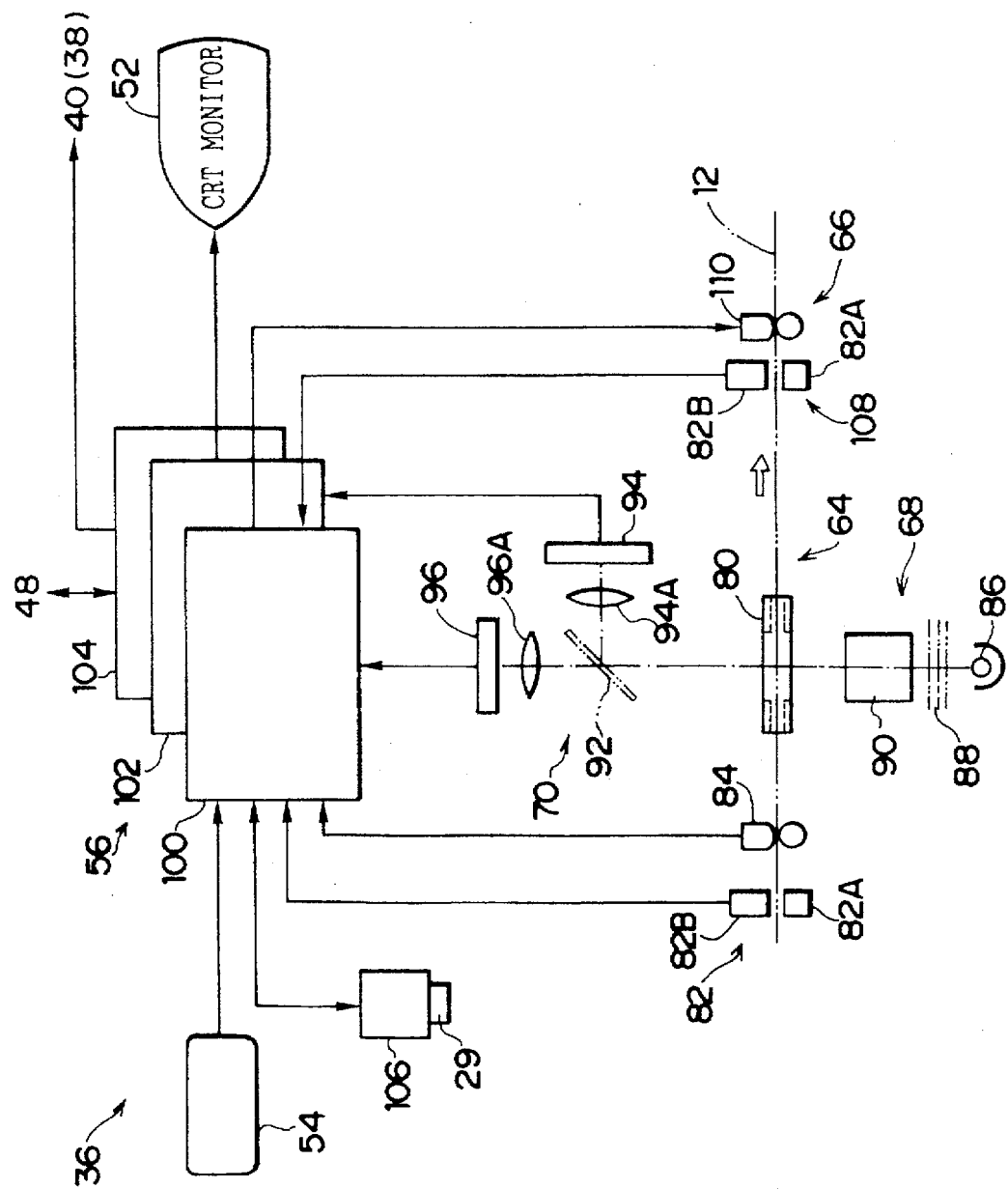
FIG. 5 is a functional block diagram schematically showing the structure of the scanner shown in FIG. 3.

As shown in FIG. 5, the film carrier 64 of the scanner 36 includes a negative mask 80, an optical sensor 82 and a magnetic read head 84. Further, the light source section 68 is provided with a light controlling filter 88 and a diffusion barrel 90 together with a light source 86 using a halogen lamp or the like and applies light emitted from the light source 86 to the negative mask 80.

Further, the image read section 70 comprises a half mirror 92, a CCD video sensor 94 and a CCD image sensor 96. The light emitted from the light source 86 passes through the film carrier 80. In addition, the light is transmitted through the half mirror 92 so as to be focused onto the CCD image sensor 96 by a lens 96A. Part of the light is reflected by the half mirror 92 so as to be focused onto the CCD video sensor 94 by a lens 94A.

Further, the computer 56 comprises a main board 100 provided with a CPU, a video memory board 102 and an interface board 104. The optical sensor 82 and magnetic read head 84 of the film carrier 64 and the CCD image sensor 96 of the image read section 70 are respectively electrically connected to the main board 100. The CCD video sensor 94 of the image read section 70 is electrically connected to the video memory board 102.

The optical sensor 82 is provided in plural form along the transverse direction of the negative film 12. The optical sensor 82 can read the splice tapes 13 (see FIG. 2A) for connecting the negative films 12 adjacent to each other to one another, the around perforations 14A and 18A and the perforations 24 defined in each negative film 12, and a DX code and an FID optically recorded on each negative film 12 from a change in light applied from a projector 82A so as to reach a light receiver 82B. Further, the optical sensor 82 can read an image size recorded in each image frame 16A of the negative film 12. The magnetic read head 84 can read magnetic information recorded on each magnetic track 26 of the negative film 12.

A card reader/writer 106 with an LSI card 29 loaded therein is connected to the main board 100. When the LSI card 29 moved along with the negative roll 28 is loaded in the card reader/writer 106, the card reader/writer 106 reads the information recorded on the LSI card 29 and additionally writes predetermined information into the LSI card 29.

While the optical information and magnetic information are being read, the respective image frames 16A in the negative film 12 conveyed to the film carrier 64 are successively placed in a predetermined aperture position of the negative mask 80. After the image frames 16A have been successively placed in the predetermined aperture position, they are irradiated with the light emitted from the light source section 68. When the light applied to the negative film 12 from the light source section 68 is transmitted according to the image of each image frame 16A of the negative film 12, the light is focused onto the CCD image sensor 96. The main board 100 determines densities of images every R, G and B colors from the result of detection by the CCD image sensor 96. The printer section 40 sets an exposure condition for suitably printing the images onto photographic printing paper. When the exposure condition is set based on the result of measurement by the CCD image sensor 96, various methods such as a method of calculating a Large Area Transmittance Density (LATD) or a screen density mean (density mean: Dm) and setting an exposure condition from the difference between the result of calculation and the pre-set reference value can be used.

Further, the light emitted from the light source section 68, which has been transmitted through the negative film 12, is also focused onto the CCD video sensor 94. Thus, each image recorded on the negative film 12 is captured into the video memory board 102. The video memory board 102 processes the images captured by the CCD video sensor 94 so that they can be displayed on the display 52. At this time, the images of the respective image frames 16A are displayed on the display 52 at color tones and densities according to the exposure condition set by the main board 100.

When the photographic processing system 10 includes the function (e.g., an index printer) of collectively printing images recorded on one negative film 12 onto photographic printing paper so as to create or form an index print, the image, which has been brought into the video memory board 102 of the scanner 36, is outputted to the index printer where the index print can be formed using the image captured by the scanner On the other hand, the magnetic write section 66 comprises an optical sensor 108 and a magnetic write head 110, which are electrically connected to the main board 100. In the magnetic write section 66, the date (year/month/day), the time, etc. of a simultaneous print process are written into their corresponding magnetic tracks 26 of respective negative films 12 delivered to the scanner 36 as magnetic information after the films 12 have been developed by the film processor 34 for the simultaneous print process. These magnetic information are used upon an extra-print process to be described later. When no FID are recorded on the magnetic tracks 26 of the negative films 12 as the magnetic information (e.g., when the negative films 12 for the simultaneous print are used), FID can be recorded on their corresponding negative films 12 by the scanner 36.

The magnetic write head 110 may be provided in the film carrier 64. It is thus possible to eliminate the need for the optical sensor 108 provided within the magnetic write section 66 and the dance rollers 62B and 62C provided between the film carrier 64 and the magnetic write section 66.

On the other hand, the database server 48 and the printer section 40 of the printer processor 38 are respectively connected to the interface board 104 of the scanner 36. The interface board 104 outputs an FID and exposure conditions for respective image frames 16A for each negative film 12. The database server 48 allows a recording medium such as a hard disk, an MO disk (Magnetic Optical Disk) or the like to store information outputted from the scanner 36 therein in the form of a database with the date and the time as standards. Further, the interface board 104 outputs the exposure conditions for the respective negative films 12, which have been set by the scanner 36, to the printer section 40. As described previously, the printer section 40 prints the images of the respective image frames 16A onto photographic printing papers based on the exposure conditions outputted from the scanner 36 so that photographic prints each having suitable finish quality can be obtained.

The scanner 36 can perform an automatic inspection or setting for automatically setting exposure conditions for images recorded in respective image frames 16A based on image densities read by the CCD image sensor 96 and a manual inspection or setting for manually confirming and correcting exposure conditions while displaying images read from a negative film 12 on the display 52 as positive images, based on the automatically-set exposure conditions (such as color tones, densities, etc.). One example of the manual setting by the scanner 36 will now be described.

Figure 7:
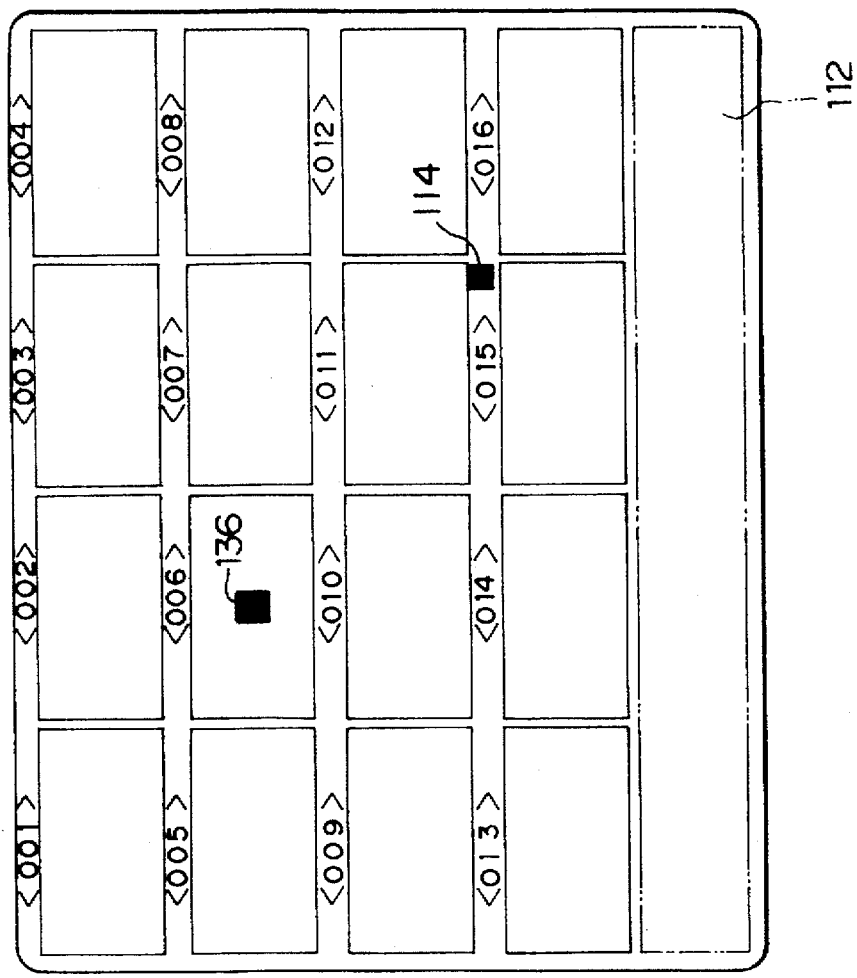
FIG. 7 is a schematic view showing examples of images displayed on a display upon manual setting.

As shown in FIG. 7, images displayed on the display 52 of the scanner 36 are arranged as, for example, sixteen frames composed of four frames extending in the vertical direction and four frames extending in the horizontal direction in such a manner that the upper-left image becomes the leading frame (corresponding to an image of an image frame whose frame number is the youngest) and the lower-right image becomes a sixteenth frame as viewed from the leading frame. At this time, the frames are arranged side by side from the leading frame to the right in order of frame numbers and the frame subsequent to that at the right end of the display 52 is placed in the left end thereof at the lower stage. Further, the frame numbers are assigned to upper positions of the respective images. A message area 112 is provided below the images of the sixteen frames in the screen of the display 52 and displays the state of processing by the scanner 36, the contents of an error, etc. thereon.

Figure 6:
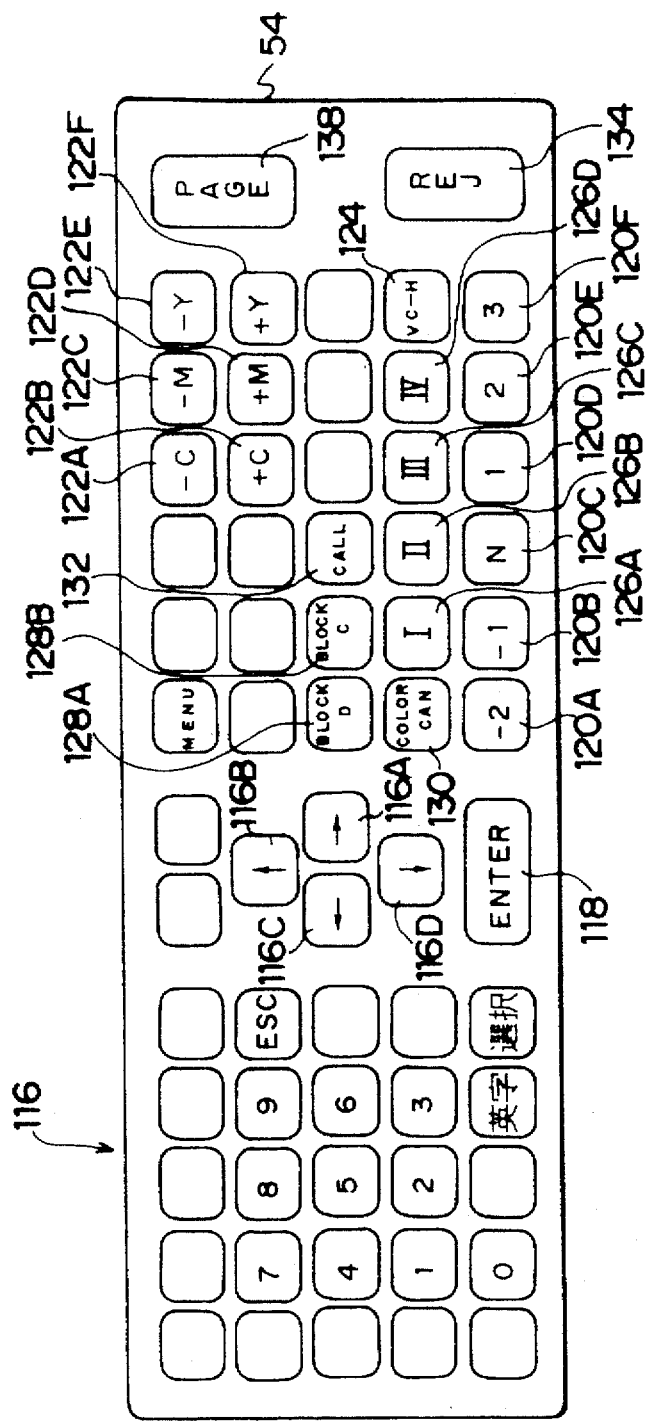
FIG. 6 is a schematic plan view illustrating a keyboard for performing setting operations.

FIG. 6 shows a key layout of the keyboard 54. The keys are operated to correct the automatically-set exposure conditions. Incidentally, the switching between the manual and automatic settings is done by an unillustrated changeover key.

The manual setting is performed after a cursor 114 indicated at the lower-right position of each image on the screen of the display 52 have been matched with an image to be inspected or set. The cursor 114 is indicated at the lower right position of each image, for example. The cursor 114 can be shifted in arrow directions respectively designated by arrow keys 116A, 116B, 116C and 116D and jumped to a desired frame under the key operation of a ten-key set 116. Further, the cursor 114 can be shifted to the next image in a manner similar to the arrow key 116A by operating an enter key 118 when a condition for correcting an image pointed out by the cursor 114 is determined.

Density correction keys 120A, 120B, 120C, 120D and 120F are able to correct values corresponding to their key displays by addition. Color correction keys 122A, 122B, 122C, 122D, 122E and 122F are capable of correcting colors (Y, M and C) corresponding to their key displays by addition and subtraction. Upon collection correction, the color correction keys are used to correct the difference between the standard density and the densities of the colors so that it becomes large by a high collection correction key 124. Function keys 126A, 126B, 126C and 126D are respectively capable of selectively correcting pre-set conditions.

Further, block correction keys 128A and 128B are respectively used to collectively effect a density correction (done by the block correction key 128A) and a color correction (done by the block correction key 128B) on a plurality of selected images. A color cancel key 130 is used to invalidate or cancel the color correction, collection correction and function correction. A call key 132 is used to call a color-corrected state, a collection-corrected state or a function-corrected state (corrected value) of the immediately-preceding corrected image and define it as a condition for correcting a working image on which the cursor is put.

A reject key 134 is used to exclude an image pointed out by the cursor 114 from printing work. As shown in FIG. 7, a reject mark 136 is displayed in the center of a displayed image operated by the reject key 134. A page key 138 is used to select an image to be next set after the images of the sixteen frames displayed on the display 52 have been corrected.

On the other hand, information about whether or not any key has been operated for the exposure condition corrected under the operations of these keys, e.g., the automatically-set exposure condition, is outputted to the printer section 40 of the printer processor 38 and the database server 48 as an exposure condition. The printer section 40 sets an exposure condition based on the information.

When a negative film 12 (negative roll 28B) to be subjected to an extra-print process is loaded in the scanner 36, the computer 56 of the scanner 36 reads the magnetic information recorded on the LSI card 29 or each magnetic track 26 of the negative film 12 and confirms based on the read information whether the date and the time of the simultaneous print process have been recorded. When it is found that they have been recorded, the computer 56 retrieves the data stored in the database server 48 under the condition of retrieval done in order of the date, time and FID. When the computer 56 detects the corresponding negative film 12 from the data stored in the database server 48, the computer 56 reads the exposure condition stored for each image of the detected negative film 12 and outputs the same to the printer section 40 of the printer processor 38 as the exposure condition for each image recorded on the negative film 12.

The operation of the first embodiment will next be described.

A brief explanation of the photographic processing system 10 will first be made. In the photographic processing system 10, the detacher 30 pulls out negative films 12 from cartridges 20 holding therein the negative films 12 in which images have been photographed. The splicer 32 connects the pulled-out negative films 12 to one another with splice tapes 13. Thereafter, the film processor 34 develops the negative roll 28 formed by winding the connected negative films 12 in roll form. At this time, a roll ID indicative of a negative roll 28A and a CID indicative of a cartridge 20 holding therein negative films 12 wound as the negative roll 28A are recorded on an LSI card 29.

When the developed negative roll 28A is loaded in the scanner 36, the respective images of the negative films 12 are read and exposure conditions for the images at the printer section 40 of the next printer processor 38 are set. These exposure conditions are outputted from the scanner 36 and read into the print section 40 of the printer processor 38.

On the other hand, when it is desired to effect an extra-print process on the images recorded on each negative film 12, the negative films 12 subjected to development are pulled out from the cartridge 20 and wound in roll form so as to form a negative roll 28B. At this time, information indicative of the contents for performing the extra-print process is recorded on an LSI card 29 associated with the negative roll 28B. If the date and the time of execution of the development (simultaneous print process) are already stored as the magnetic information recorded on each magnetic track 26 of the negative film 12, then these information are also recorded on the LSI card 29 together with the FID read from each negative film 12.

When the negative roll 28B is also loaded in the scanner 36 in a manner similar to the aforementioned negative roll 28A and the exposure condition for the image of each image frame 16A of the negative film 12 is set, the negative roll 28B is conveyed to the printer processor 38.

The printer processor 38 in the printer processor 38 first prints the respective images recorded on the negative film 12 onto photographic printing paper withdrawn from the paper roll based on the exposure condition set by the scanner 36. Thereafter, the photographic printing paper is sent to the processor section 42 where it is immersed into processing liquids so as to form a print roll 46. After the respective images in the print roll 46 have been inspected, the print roll 46 is cut every images and sorted as photographic prints for each roll.

In the photographic processing system 10, the exposure condition for each image of the negative film 12 is established by the scanner 36. At this time, the scanner 36 can prevent the difference in finish state between each photographic print at the time of the simultaneous print and each photographic print at the time of the extra print from occurring. The setting of the exposure conditions by the scanner 36 will be described with reference to flowcharts shown in FIGS. 8A and 8B.

When the negative roll 28 is placed in the scanner 36 together with the LSI card 29, steps on the flowcharts are executed.

Figure 8A:
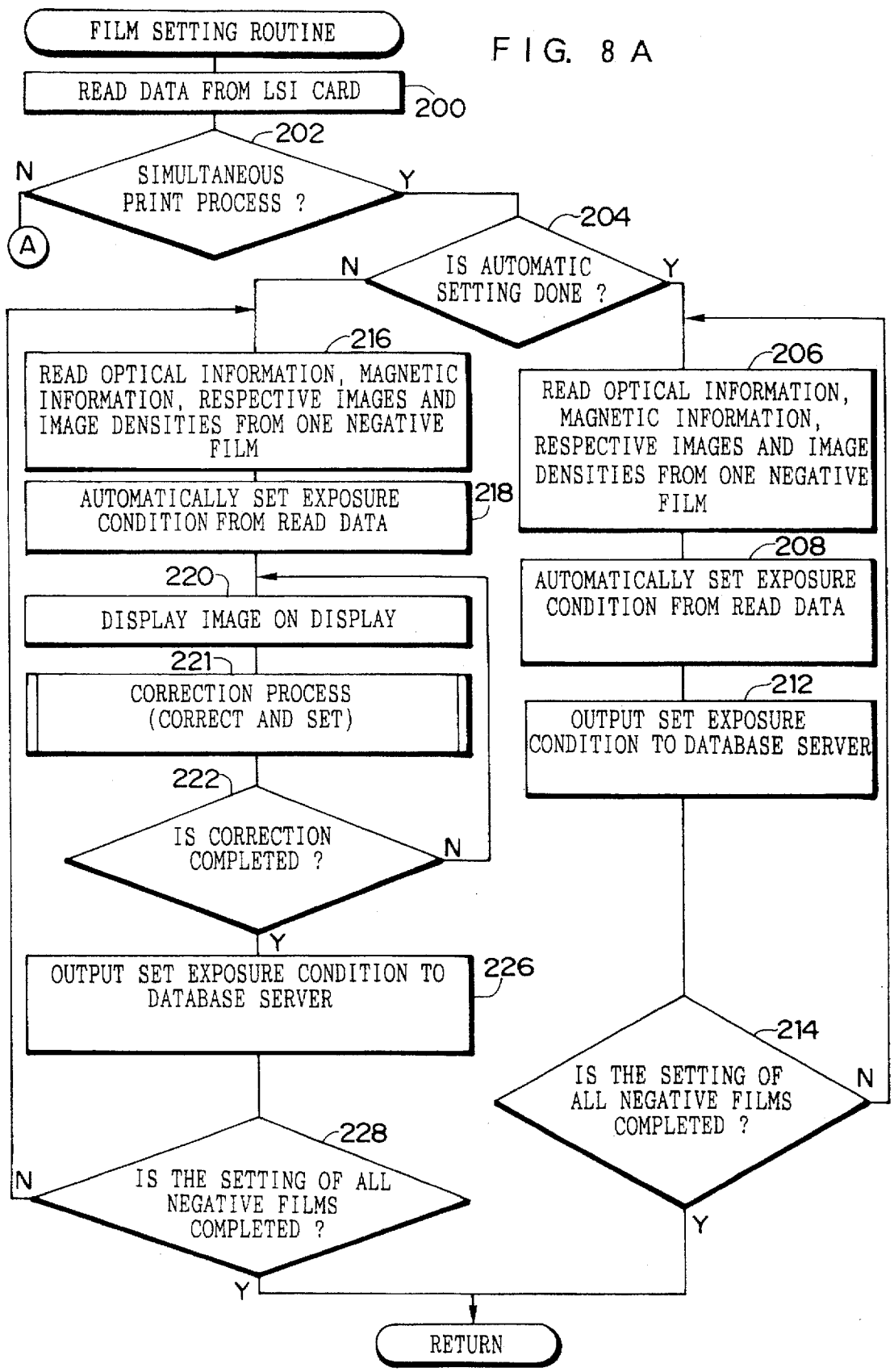
FIG. 8A is a flowchart for describing one example of a setting process to be executed by the scanner shown in FIG. 3.
Figure 8B:
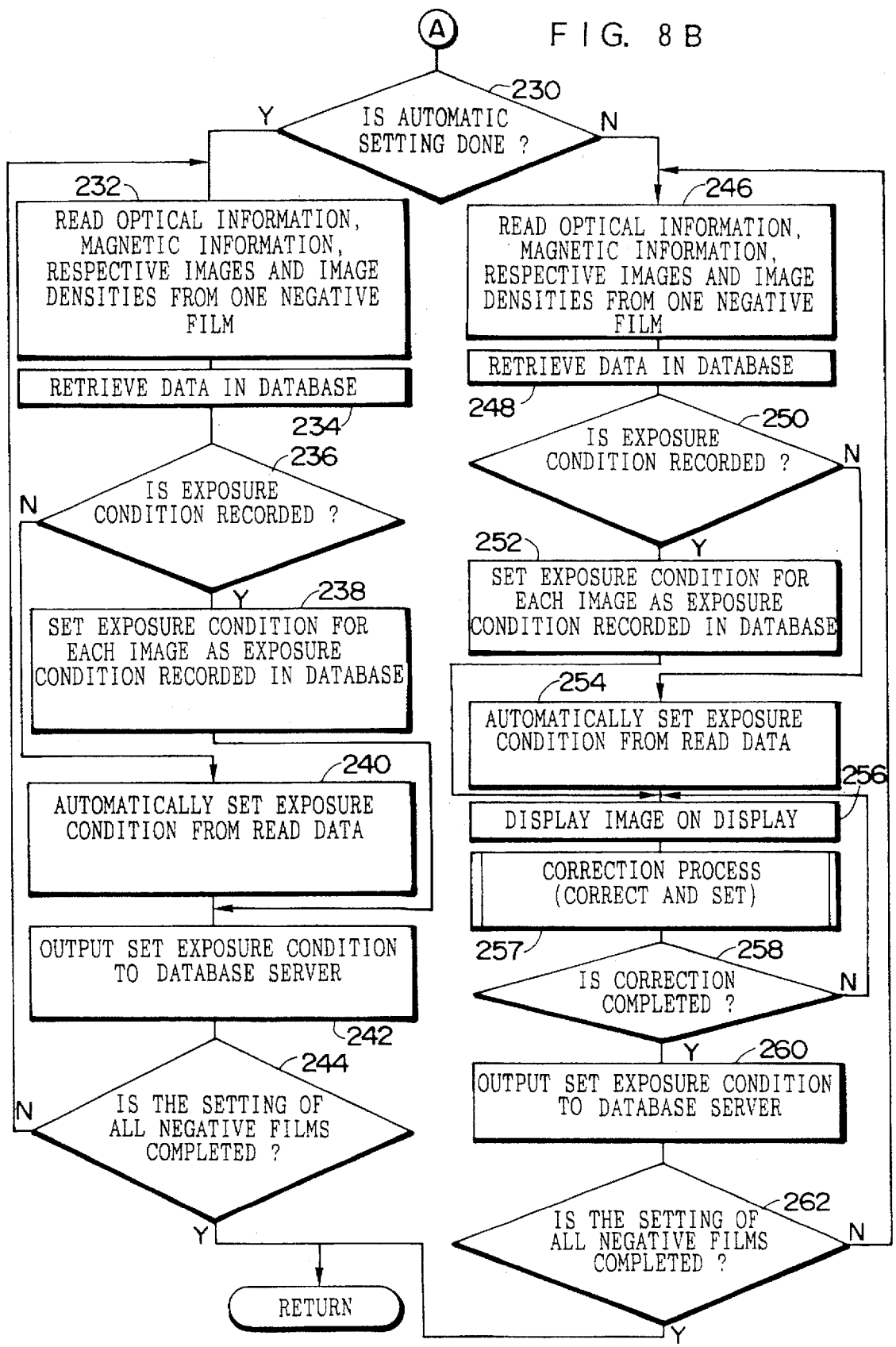
FIG. 8B is a flowchart for describing another example of a setting process to be executed by the scanner shown in FIG. 3.

In the initial step 200 of the flowchart shown in FIG. 8A, the information about the negative roll 28 and the respective negative films 12, which has been recorded on the LSI card 29 loaded in the card reader/writer 106 is read. It is judged in the next step 202 whether the read information is associated with the negative films 12 to be subjected to the simultaneous print process.

A description will first be made of the case where the negative films 12 or the negative roll 28A to be subjected to the simultaneous print process, which has been loaded in the scanner 36 after being subjected to development by the film processor 34, has been loaded in the scanner 36.

When the negative roll 28A to be subjected to the simultaneous print process is loaded in the scanner 36, an affirmative decision is made in Step 202 and the routine procedure proceeds to Step 204. It is confirmed in Step 204 whether the exposure condition should be automatically set. If the answer is determined to be affirmative in Step 204, then the routine procedure proceeds to Step 206 where an automatic setting process is started.

In Step 206, the negative films 12 is conveyed from the reel 58A to the reel 58B. The film carrier 64 reads images recorded in respective image frames and densities of the images recorded thereon together with optical information and magnetic information recorded on one negative film 12. In the next Step 208, a predetermined computation is done based on the read data (image densities in particular) so as to automatically set the exposure condition.

After the exposure condition has been automatically set, the set exposure condition is outputted to the database server 48 in the next Step 212. Along with the exposure condition, the date and the time of a process (such as a simultaneous print process) are written into the corresponding magnetic tracks 26 of each inspected negative film 12 as magnetic information. When the magnetic information is read from the corresponding magnetic track 26, the date and the time of execution of the development or the like of the negative film 12 can be recognized.

When the exposure condition set by the scanner 36 is input, the database server 48 records the exposure condition together with the date, time and FID of the process (such as the simultaneous print process) therein. It is thus possible to easily retrieve and read the exposure condition for each negative film 12 based on the date and the time.

The exposure conditions are repeatedly set for the respective negative films 12 in turn until it is determined in Step 214 that the setting of the exposure conditions for all the negative films 12 of each negative roll 28A has been completed. When all the negative films 12 have been set (i.e., when the affirmative decision is made in Step 214), the processing on the negative roll 28A is terminated.

On the other hand, when a negative decision, i.e., a manual setting is selected in Step 204, the routine procedure proceeds to Step 216 where a manual setting process is executed.

When the manual setting process is selected, the optical information, magnetic information, respective images and respective image densities of one negative film 12 are first read in Step 216. In the next Step 218, an exposure condition is automatically set from the read data. In the next Step 220, each image is displayed on the display 52 according to the set exposure condition. In Step 221, an operator who performs the manual setting process using the scanner 36, can operate the keys on the keyboard 54 while seeing the screen of the display 52 so as to correct and set the exposure condition.

Namely, the correction and/or setting of the exposure condition is executed based on the exposure condition automatically set by the scanner 36. The operator selects one of the images under the operations of the keys such as the arrow keys 116A, 116B, 116C and 116D, the ten-key set 116 while looking at the images displayed on the display 52. Further, the operator performs a correction on the automatically-set exposure condition for the selected image under the operations of the density correction keys 120A, 120B, 120C, 120D, 120E and 120F, the color correction keys 122A, 122B, 122C, 122D, 122E and 122F, the high collection correction key 124, the function keys 126A, 126B, 126C and 126D, the block correction keys 128A and 128B, the color cancel key 130, the call key 132, the reject key 134, etc.

The computer 56 determines whether any key has been operated for the automatically-set exposure condition as correction information and sets the automatically-set exposure condition and the correction information as an exposure condition for each image of the negative film 12. Owing to the setting of the exposure condition in this way, less data capacity can be provided. Further, since the exposure condition is computed and set according to each image in advance and the correction may be effected on the set exposure condition, the work of setting thereof becomes so easy.

After it has been confirmed that the setting of the exposure condition for each negative film 12 has been completed, the routine procedure proceeds to Step 226. The computer 56 outputs the exposure condition to the database server 48 so that the database server 48 stores the same therein. If the setting of all the negative film 12 of the negative roll 28A has been completed (if it is judged in Step 228 that all the negative films 12 have been set), then the process of setting the negative roll 28A is terminated.

Thus, the database server 48 of the photographic processing system 10 stores therein the exposure condition for each image of the negative film 12, which has been set by the scanner 36 for each simultaneous print process, in the form of a data base with the date and the time as standards together with the FID.

When a negative roll 28B of negative films 12 to be subjected to an extra-print process is now placed in the scanner 36, a negative decision is done in Step 202 and the routine procedure proceeds to Step 230 where exposure conditions for the extra-print process are set by the scanner 36. Even upon the subsequent extra-print process, the basic process is similar to that at the time of the simultaneous print except for part thereof.

It is confirmed in Step 230 whether an automatic setting should be done. If the answer is determined to be affirmative in Step 230, then the routine procedure proceeds to Step 232. In Step 232, various information are read from each negative film 12 in a manner similar to Step 206. When the date and the time of the simultaneous print process, which have been recorded on the magnetic track 26, are read at this time, the data stored in the database server 48 is retrieved based on the read date and time in the next Step 234. It is confirmed in Step 236 whether the exposure condition for the same FID as that for this negative film 12 has been recorded.

When the exposure condition at the time of the simultaneous print of the negative film 12 has been recorded in the database server 48, the exposure condition is read from the database server 48 and set as the exposure condition for each image recorded on the negative film 12. Namely, the exposure conditions for the respective images recorded on the negative film 12 to be subjected to the extra-print process are set so as to be identical to the exposure conditions at the time of the simultaneous print. If the information (date and time) at the time of the simultaneous print is not recorded on the negative film 12, then the data stored in the database server 48 is retrieved based on the FID for the negative film 12. When the exposure condition for the negative film 12 is not stored in the database server 48, the routine procedure proceeds to Step 240 where the exposure condition is automatically set.

When the exposure condition is set in this way, the set exposure condition is outputted to the database server 48 in the next Step 242. When it is confirmed in Step 244 that the exposure conditions have been automatically set to all the negative films 12 of the negative roll 28B, the above steps in this flowchart are terminated.

On the other hand, when the answer is determined to be negative in Step 230 to perform the manual setting, optical information, magnetic information, respective images and densities of the respective images are read from each negative film 12 in Step 246. Thus, if the date and the time of the simultaneous print process are found to have been recorded as the magnetic information, then the data stored in the database server 48 is retrieved based on the date and the time in Step 248.

When it is judged in Step 250 that an exposure condition at the time of the simultaneous print of each negative film 12 has been recorded in the database server 48, the exposure condition is read from the database server 48 and set as an exposure condition for each image on the negative film 12 in Step 250. When the answer is determined to be negative in Step 250 and the previous exposure condition (corresponding to the exposure condition at the time of the simultaneous print) is not recorded in the database server 48, the routine procedure proceeds to Step 254 where the exposure condition is automatically set.

In the next Step 256, an image to be inspected is displayed on the display 52 based on the set exposure condition. Further, a correction process is effected on the image in Step 257. If it is confirmed in Step 258 that the correction process has been completed, then the routine procedure proceeds to Step 260 where the set exposure condition is outputted to and stored in the database server 48 as information at the time of the extra print together with the date, time and FID. Thus, if the extra-print process on the negative film 12 is next required, then the exposure conditions stored in the database server 48 can be read. When these processes have been effected on all the negative films 12 of the negative roll 28 (i.e., when a confirmation in Step 262 has been made), the steps in this flowchart are finished.

Thus, the exposure condition at the time of the extra print can be accurately set to the same exposure condition as that at the time of the simultaneous print by recording the exposure condition at the time of the simultaneous print in the database server 48. It is therefore possible to prevent the difference in finish state between each photographic print at the time of the extra print of each image on the same negative film 12 and each photographic print at the time of the simultaneous print of each image on the same negative film 12 from occurring. Even in either case of the simultaneous print and the extra print, photographic prints identical in finish to each other can be obtained. Even upon the extra print, an exposure condition at the time of the next extra print can be easily set by storing exposure conditions in the database server 48. Further, photographic prints identical in quality to those at the time of the present extra print can be obtained.

Since the exposure conditions for the respective negative films 12 at the time of the simultaneous print are retrievably set in the form of a database with the date and the time of the simultaneous print as standards in the database server 48, they can be efficiently retrieved in a relatively short time. When one attempts to retrieve data, based on an FID for specifying a negative film 12, for example, all the data (all FID) recorded in the database server 48 must be retrieved. On the other hand, the setting of the date and time in which the sequence of recording of data in the database server 48 is definite, as standards can simplify the creation of the database and facilitate retrieval of the data, whereby a processing load applied to the database server 48 can be reduced.

Incidentally, the images non-subject to the print process and the number of prints for the images may be recorded in the LSI card 29 in advance upon the extra-print process or may be set upon film inspection or setting.

A second embodiment will now be described. Incidentally, the second embodiment is identical in basic structure to the first embodiment. The same elements of structure as those employed in the first embodiment are identified by like reference numerals and their description will therefore be omitted.

Figure 9:
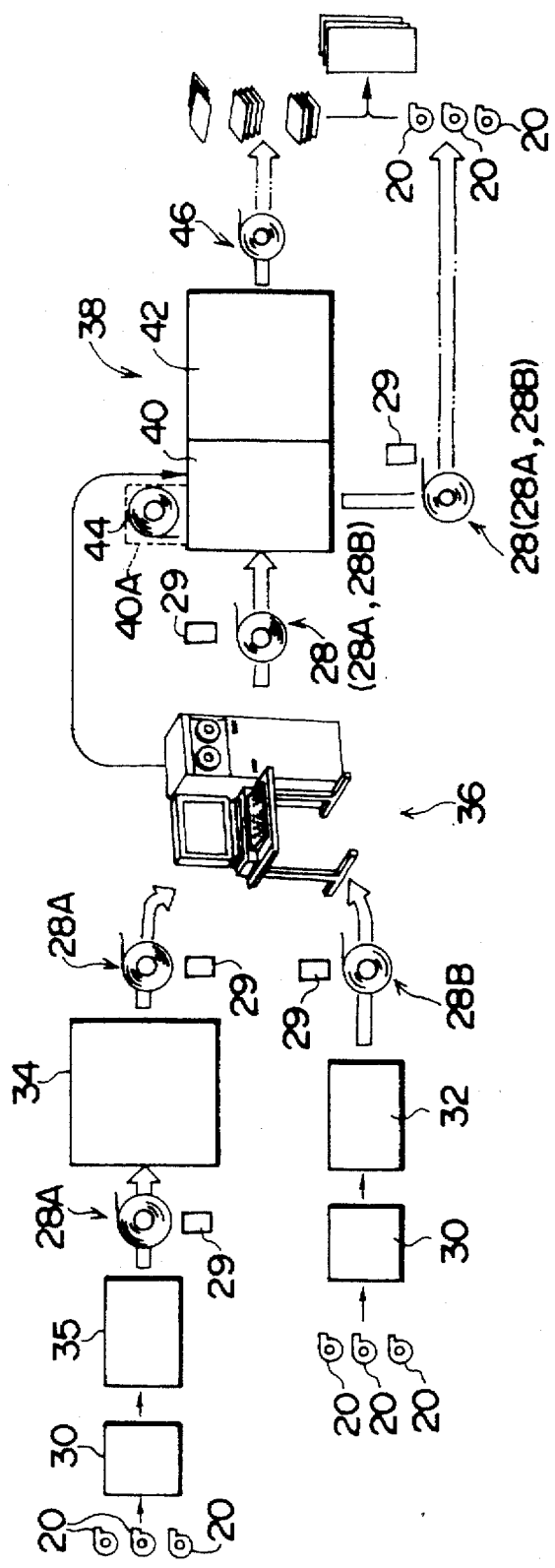
FIG. 9 is a schematic view showing part of a photographic processing system according to a second embodiment of the present invention.

FIG. 9 schematically shows the structure of a photographic processing system 150 according to the second embodiment. The photographic processing system 150 is configured so as to exclude the database server 48 from the photographic processing system 10 according to the first embodiment and record exposure conditions set by a scanner 36 on magnetic tracks 26 of individual negative films 12.

Figure 10A:
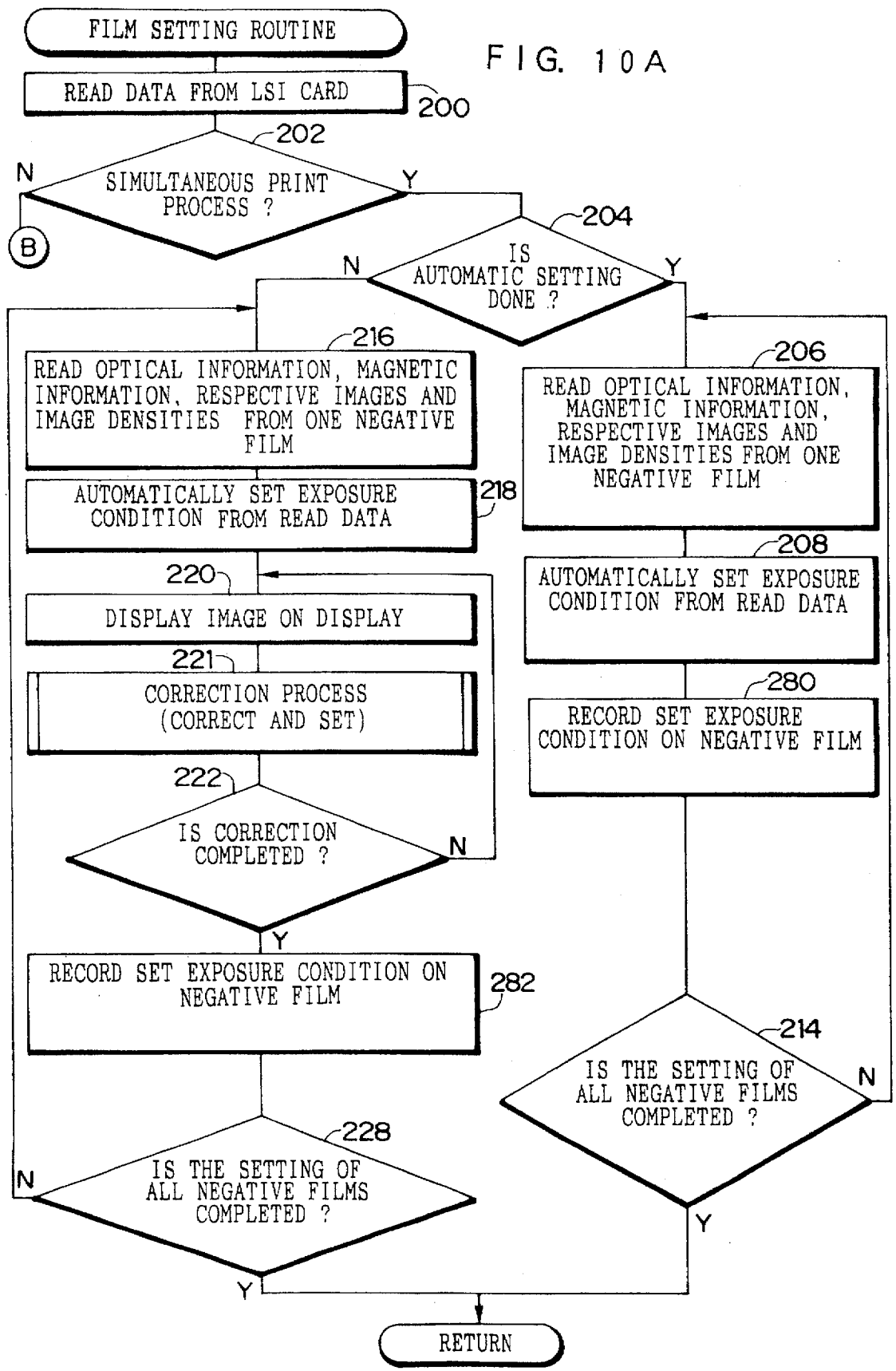
FIG. 10A is a flowchart for describing one example of a setting process to be executed by a scanner employed in the second embodiment.
Figure 10B:
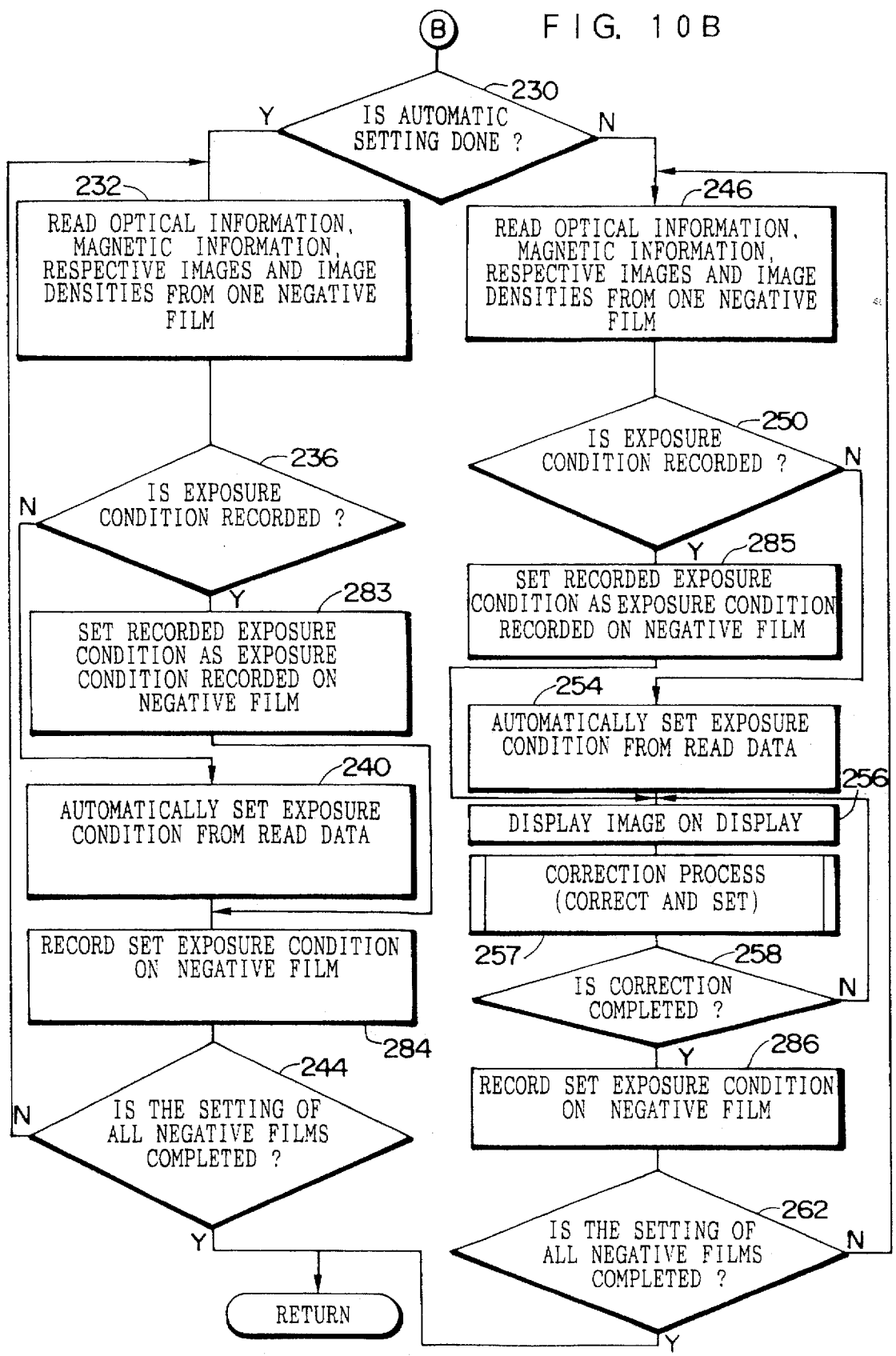
FIG. 10B is a flowchart for describing another example of a setting process to be executed by the scanner shown in FIG. 9.

Examples of processes for setting exposure conditions by the scanner 36 employed in the second embodiment are respectively shown in flowcharts shown in FIGS. 10A and 10B. The flowcharts are identical in basic flow to the flowcharts shown in FIGS. 8A and 8B in the first embodiment.

In the flowcharts, information on an LSI card 29 is read in Step 200 when a negative roll 28A is loaded in the scanner 36. It is next confirmed in Step 202 whether a simultaneous print process should be done. It is thereafter confirmed in Step 204 or 230 whether an automatic setting should be done. When the simultaneous print is selected and the automatic setting to the negative roll 28A is selected, optical information, magnetic information, images and image densities in each negative film 12 are read in Step 206. Further, an exposure condition is automatically set based on the read data in Step 208.

In the next Step 280, the set exposure condition is written into its corresponding magnetic track 26 of the negative film 12 by a magnetic write head 110. At this time, a device ID capable of specifying a photographic processing system 150 that has done the simultaneous print process, is recorded therein together. It is next possible to make a decision as to whether when the exposure condition is read from the magnetic track 26, photographic prints can be formed using the exposure condition as it is, or the exposure condition needs to be corrected in consideration of dimensional individualities produced for each photographic processing system.

When the answer is determined to be negative in Step 204 and the negative roll 28A is manually set, Steps 216, 218, 220 and 221 are executed. Further, when exposure conditions for all the images on the negative film 12 are set and confirmed in Step 222, the routine procedure proceeds to Step 282 where the set exposure conditions for the respective images on the negative film 12 are written into their corresponding magnetic tracks 26 of the negative film 12.

On the other hand, when the answer is determined to be negative in Step 202 and an affirmative decision is done in Step 230 so as to automatically set a negative roll 28B, the routine procedure proceeds to Step 232 where optical information, magnetic information, images and image densities of each negative film 12 are read. It is confirmed in the next Step 236 whether an exposure condition has been recorded as magnetic information. If it is determined in Step 236 that the exposure condition has been recorded on the corresponding magnetic track of the negative film 12, then the recorded exposure condition is set as the exposure condition recorded on the negative film in Step 283. Further, in Step 284, the date and the time of processing and a device ID are additionally written into the magnetic track 26 of the negative film 12 or data including exposure conditions is renewed, as needed.

If the answer is determined to be negative in Step 236, i.e., it is judged in Step 236 that no exposure condition is recorded on the magnetic track 26 of the negative film 12, then the routine procedure proceeds to Step 240 where an exposure condition is automatically set based on the image densities and the like read from the negative film 12. Thereafter, the exposure condition set in Step 284 is written into the corresponding magnetic track 26 of the negative film 12.

When the exposure condition has been already recorded on the negative film 12, it is confirmed whether the device ID recorded together with the exposure condition corresponds to the photographic processing system 150. Further, if dimensional individualities definitely arise between other photographic processing system in which an exposure condition has been recorded and the photographic processing system 150, then the exposure condition may be automatically corrected based on this description in agreement with the photographic processing system 150. If the dimensional individualities developed therebetween are determined to be indefinite, then the routine procedure proceeds to Step 240 without using the exposure condition, where a new exposure condition may be set by the scanner 36.

On the other hand, even when the answer is determined to be negative in Step 230 so as to manually set one negative film 12 of the negative roll 28B, the information recorded on the negative film 12 is read in Step 246. When it is determined in Step 250 that an exposure condition has been recorded on its corresponding magnetic track, an image is displayed on the display 52 in accordance with the exposure condition and a correction is effected on the exposure condition in Steps 285, 256 and 257. On the other hand, when no exposure condition is recorded on the magnetic track, the exposure condition is set based on the density of the image and the like and the image is corrected with the set exposure condition as the reference in Steps 254, 256 and 257.

Owing to the recording of the exposure condition at the time of the simultaneous print or the previous print process on each negative film 12, the photographic prints corresponding to the images recorded on the respective negative films 12 can be finished in a manner similar to the photographic prints at the time of the simultaneous print or the photographic prints at the time of the previous extra print.

A third embodiment will next be described. Incidentally, the third embodiment is identical in basic structure to the first embodiment. The same elements of structure as those employed in the first embodiment are identified by like reference numerals and their description will therefore be omitted.

FIG. 11 shows a photographic processing system 160. A plurality of scanners 36 are connected to a LAN server 162 of the photographic processing system 160, which is equipped with an unillustrated storage device for recording exposure conditions of respective negative films 12. The scanner 36 and one or a plurality of printer processors 38 constitute each of sub photographic processing systems 164A, 164B and 164C (hereinafter called "photographic processing systems 164" unless distinguished from others in particular) for creating photographic prints corresponding to images recorded on the negative films 12.

An example is illustrated in FIG. 11, in which in the sub photographic processing systems 164A and 164C shown in FIG. 11, the respective one printer processors 38 are connected to the scanners 36 respectively and in the sub photographic processing system 164B, the two printer processors 38 are connected to one scanner 36. Other configurations are not shown in the drawing.

The exposure conditions for the negative films 12, which have been set by the scanners 36 of the respective sub photographic processing systems 164, are recorded in the LAN server 162 together with devices ID for respectively specifying the sub photographic processing systems 164, the date and the time of processing, and FID. Further, the scanners 36 can respectively set exposure conditions based on pre-set standards and any of the sub photographic processing system 164 can obtain photographic prints identical in quality to each other.

Namely, in the photographic processing system 160, the LAN server 162 is connected with the scanners 36 of the plurality of sub photographic processing systems 164 to configure a network (Local Area Network: LAN). In the photographic processing system 160 (network), the exposure conditions set by the scanners 36 can be collectively stored in the LAN server 162. Further, the exposure conditions recorded in the LAN server 162 can be read by any scanners 36 of the plurality of sub photographic processing systems 164. If the same exposure condition is selected, then any sub photographic processing system 164 can obtain photographic prints identical in quality to each other.

The use of such a photographic processing system 160 permits a simultaneous print process and an extra-print process of a large number of negative films 12 and can provide photographic prints identical in finish to the previous photographic prints upon the extra print. Thus, there is no difference between each photographic print at the time of the extra print and each photographic print at the time of the simultaneous print or the previous extra print.

Incidentally, one or a plurality of sub photographic processing systems 164 may be installed in each individual laboratory so as to be connected to a LAN server 162 through a communication network or line. Alternatively, a plurality of LAN servers 162 are respectively connected to sub photographic processing systems through a communication line or the like so as to construct a network. Thus, even if an extra-print process is executed by the sub photographic processing system 164 of another laboratory using exposure conditions processed by the sub photographic processing system 164 of any laboratory, which is connected to the LAN server 162 through the network, photographic prints, which are finished in the same way at all times, can be formed.

Having now fully described the invention, it will be apparent to those skilled in the art that many changes and modifications can be made without departing from the spirit or scope of the invention as set forth herein.

What is claimed is:

1. A photographic processing system operable to print images which have been recorded on a photographic film onto photographic printing paper to form photographic prints, comprising:

a film setting section for setting exposure conditions by which the images recorded on each photographic film are printed onto photographic printing paper;

a storage section for storing the exposure conditions set by said film setting section for respective images recorded on each photographic film an exposure condition setting section for confirming that exposure conditions are stored for the images of a photographic film, for setting the exposure conditions stored in said storage section as exposure conditions for the images of said each photographic film when photographic prints corresponding to images on each photographic film are re-printed when it is confirmed that the exposure conditions are stored, and for setting exposure conditions when it is not confirmed that the exposure conditions are stored; and a photographic print section responsive to at least one of said film setting section and said exposure condition setting section, for printing the images on the photographic film onto the photographic printing papers based on the exposure conditions, wherein said printing section responds to said film setting section during a first printing of photographic prints from the photographic film and said printing section responds to said exposure condition setting section during subsequent printing of photographic prints from the photographic film.

2. A photographic processing system according to claim 1, wherein said storage section comprise a recording layer provided on said each photographic film.

3. A photographic processing system according to claim 2, wherein said recording layer is recordable by magnetism.

4. The photographic processing system according to claim 3, wherein said exposure condition includes identification for a system used during a previous printing of the photographic film, and said exposure condition setting section adjusts the exposure condition by a predetermined degree when the identification for the previous system does not coincide with identification for a present system.

5. A photographic processing system according to claim 1, wherein said storage section comprises a database server.

6. A photographic processing system according to claim 5 including a plurality of film setting sections, wherein said storage section is connected to said plurality of said film setting sections to form a network.

7. A photographic processing system according to claim 1, wherein said exposure condition setting section searches for and sets the exposure conditions based on at least one of: a device identification code specifying a photographic processing system at which a first printing of the photographic film was carried out, a date and a time when the first printing was carried out using the photographic film, the device identification code stored in said storage section for the photographic film, and a date and a time stored in said storage section for the photographic film.

8. A photographic processing system according to claim 1,
wherein said film setting section includes a section for automatically setting the exposure condition and a section for manually setting the exposure condition, the automatic setting section including:

a light source to transmit light through each frame of the photographic film onto a charge coupled device image sensor; and a means for calculating differences between outputs of the charge coupled image sensor and a predetermined set of reference values, the exposure condition being set based on said differences;

the manual setting section including:
a charge coupled video sensor device for receiving the light which is transmitted through each frame of the photographic film;
a video interface for converting outputs of said charge coupled video sensor into a video display; and
an input device for making visual adjustments to the video display, the exposure condition being set based on said visual adjustments.

9. A photographic processing system operable to print images which have been recorded on a photographic film onto photographic printing paper to form photographic prints, comprising:

a film setting section for setting exposure conditions by which the images recorded on each photographic film are printed onto photographic printing paper;

a storage section, comprising a recording layer on each photographic film, for storing the exposure conditions set by said film setting section for respective images recorded on each photographic film;

an exposure condition setting section for setting the exposure conditions stored in said storage section as exposure conditions for the images of said each photographic film when photographic prints corresponding to images on each photographic film are re-printed; and a photographic print section responsive to at least one of said film setting section and said exposure condition setting section, for printing the images on the photographic film onto the photographic printing papers based on the exposure conditions wherein said printing section responds to said film setting section during a first printing of photographic prints from the photographic film and said printing section responds to said exposure condition setting section during subsequent printing of photographic prints from the photographic film, wherein said film setting section has a reading member for determining whether an exposure condition has been recorded on said recording layer, and recording member for recording the exposure condition on said recording layer.

10. A photographic processing system according to claim 9, wherein said reading member is a magnetic reading member and said recording member is a magnetic recording member.

11. A photographic processing system operable to print images recorded on a photographic film onto photographic printing paper to form photographic prints, comprising:

a film processing section for subjecting photographic films, on which the images have been recorded, to development processing;

a film setting section, responsive to said film processing section, for setting exposure conditions by which the images recorded on each photographic film are printed on photographic printing paper;

a storage section for storing the exposure conditions set by said film setting section for respective images on each photographic film, each film being processed for development by said film processing section an exposure condition setting section for confirming that exposure conditions are stored for the images of a photographic film, for setting the exposure conditions stored in said storage section as exposure conditions for the images of said each photographic film when photographic prints corresponding to images on each photographic film are re-printed when it is confirmed that the exposure conditions are stored, and for setting exposure conditions when it is not confirmed that the exposure conditions are stored; and a photographic print section, responsive to at least one of said film setting section and said exposure condition setting section, for printing the images on the photographic film onto the photographic printing papers based on the exposure conditions wherein said printing section responds to said film setting section during a first printing of photographic prints from the photographic film and said printing section responds to said exposure condition setting section during subsequent printing of photographic prints from the photographic film.

12. A photographic processing system according to claim 11, wherein said storage section comprises a recording layer provided on said each photographic film.

13. A photographic processing system according to claim 12, wherein said recording layer is recordable by magnetism.

14. The photographic processing system according to claim 13, wherein said exposure condition includes identification for a system used during a previous printing of the photographic film, and said exposure condition setting section adjusts the exposure condition by a predetermined degree when the identification for the previous system does not coincide with identification for a present system.

15. A photographic processing system according to claim 11, wherein said storage section is a database server.

16. A photographic processing system according to claim 15, including a plurality of film setting sections, wherein said storage section is connected to said plurality of said film setting sections to form a network.

17. A photographic processing system according to claim 11, wherein said exposure condition setting section searches for and sets the exposure conditions based on at least one of: a device identification code specifying a photographic processing system at which a first printing was carried out for the photographic film, or based on a date and a time when the first printing carried out using the photographic film, the device identification code stored in said storage section for the photographic film, and a date and a time stored in said storage section for the photographic film.

18. A photographic processing system according to claim 11, wherein said film setting section includes a section for automatically setting the exposure condition and a section for manually setting the exposure condition, the automatic setting section including:

a light source to transmit light through each frame of the photographic film onto a charge coupled device image sensor; and a means for calculating differences between outputs of the charge coupled image sensor and a predetermined set of reference values, the exposure condition being set based on said differences;

the manual setting section including:

a charge coupled video sensor device for receiving the light which is transmitted through each frame of the photographic film;

a video interface for converting outputs of said charge coupled video sensor into a video display; and an input device for making visual adjustments to the video display, the exposure condition being set based on said visual adjustments.

19. A photographic processing system operable to print images recorded on a photographic film onto photographic printing paper to form photographic prints, comprising:

a film processing section for subjecting photographic films, on which the images have been recorded, to development processing;

a film setting section, responsive to said film processing section, for setting exposure conditions by which the images recorded on each photographic film are printed on photographic printing paper;

a storage section, comprising a recording layer provided on each photographic film, for storing the exposure conditions set by said film setting section for respective images on each photographic film, each film being processed for development by said film processing section;

an exposure condition setting section for setting the exposure conditions stored in said storage section as exposure conditions for the images of said each photographic film when photographic prints corresponding to images on said each photographic film are re-printed; and a photographic print section, responsive to at least one of said film setting section and said exposure condition setting section, for printing the images on the photographic film onto the photographic printing papers based on the exposure conditions, wherein said printing section responds to said film setting section during a first printing of photographic prints from the photographic film and said printing section responds to said exposure condition setting section during subsequent printing of photographic prints from the photographic film wherein said film setting section has a reading member for determining whether an exposure condition has been recorded on said recording layer, and recording member for recording the exposure condition on said recording layer.

20. A photographic processing system according to claim 19, wherein said reading member is a magnetic reading member and said recording member is a magnetic recording member.

21. A photographic processing system operable to print images recorded on a photographic film onto photographic printing paper to form photographic prints, wherein said photographic film comprises a magnetic recording layer for recording exposure information for the photographic film, said system comprising:

a film processing section for subjecting photographic films, on which the images have been recorded, to development processing;

a film setting section responsive to said film processing section, for setting exposure conditions by which the images recorded on each photographic film are printed onto photographic printing paper;

an exposure condition setting section for confirming that exposure conditions are stored for the images of a photographic film, for setting the exposure conditions stored in said storage section as exposure conditions for the images of said each photographic film when photographic prints corresponding to images on each photographic film are re-printed when it is confirmed that the exposure conditions are stored, and for setting exposure conditions when it is not confirmed that the exposure conditions are stored; and a photographic, print section, responsive to at least one of said film setting section and said exposure condition setting section for printing the images on the photographic film onto the photographic printing papers based on the exposure conditions set by said film setting section, wherein said printing section responds to said film setting section during a first printing of photographic prints from the photographic film and said printing section responds to said exposure condition setting section during subsequent printing of photographic prints from the photographic film.

22. A photographic processing system according to claim 21, wherein said film setting section includes a section for automatically setting the exposure condition and a section for manually setting the exposure condition, the automatic setting section including:

a light source to transmit light through each frame of the photographic film onto a charge coupled device image sensor; and a means for calculating differences between outputs of the charge coupled image sensor and a predetermined set of reference values, the exposure condition being set based on said differences;

the manual setting section including:

a charge coupled video sensor device for receiving the light which is transmitted through each frame of the photographic film;

a video interface for converting outputs of said charge coupled video sensor into a video display; and an input device for making visual adjustments to the video display, the exposure condition being set based on said visual adjustments.

23. A photographic processing system operable to print images recorded on a photographic film onto photographic printing paper to form photographic prints, wherein said photographic film comprises a magnetic recording layer for recording exposure information for the photographic film, said system comprising:

a film processing section for subjecting photographic films, on which the images have been recorded, to development processing;

a film setting section responsive to said film processing section, for setting exposure conditions by which the images recorded on each photographic film are printed onto photographic printing paper;

an exposure condition setting section for setting the exposure conditions stored in the magnetic recording layer of the photographic film, said exposure conditions having been set by said film setting section as exposure conditions for the images of each photographic film when photographic prints corresponding to the images on said each photographic film are re-printed; and a photographic, print section, responsive to at least one of said film setting section and said exposure condition setting section for printing the images on the photographic film onto the photographic printing papers based on the exposure conditions set by said film setting section, wherein said printing section responds to said film setting section during a first printing of photographic prints from the photographic film and said printing section responds to said exposure condition setting section during subsequent printing of photographic prints from the photographic film, wherein said film setting section has a reading member for determining whether an exposure condition has been recorded on said recording layer, and recording member for recording the exposure condition on said recording layer.

24. The photographic processing system according to claim 23, wherein said exposure condition includes identification for a system used during a previous printing of the photographic film, and said exposure condition setting section adjusts the exposure condition by a predetermined degree when the identification for the previous system does not coincide with identification for a present system.

25. A photographic processing system operable to print images recorded on a photographic film onto photographic printing paper to form photographic prints, comprising:

a film processing section for subjecting photographic films, on which the images have been recorded, to development processing;

a film setting section responsive to said film processing section, for setting exposure conditions by which the images recorded on each photographic film are printed onto photographic printing paper;

a database server for storing exposure conditions for respective images on each photographic film processed for development by said film processing section when the exposure conditions for the respective images have been set by said film setting section;

an exposure condition setting section for setting the exposure conditions stored in said database server, as exposure conditions for the images of said each photographic film when photographic prints corresponding to the images on said each photographic film are re-printed; and a print section, responsive to at least one of said film setting section and said exposure condition setting section, for printing the images on the photographic film onto the photographic printing papers based on the exposure conditions.

26. A photographic processing system according to claim 25 including a plurality of film setting sections, wherein said database server is connected to said plurality of said film setting sections to form a network.

27. A photographic processing system according to claim 25, wherein said exposure condition setting section searches for and sets the exposure condition based on at least one of: a device identification code specifying a photographic processing system at which a first printing was carried out for the photographic film, a date and a time when the first printing was carried out using the photographic film, the device identification code stored in said database memory for the photographic film, and a date and time stored in said database server for the photographic film.

28. A photographic processing system according to claim 25, wherein said printing section responds to said film setting section during a first printing of photographic prints from the photographic film and said printing section responds to said exposure condition setting section during subsequent printing of photographic prints from the photographic film.

29. A photographic processing system according to claim 25, wherein said film setting section includes a section for automatically setting the exposure condition and a section for manually setting the exposure condition, the automatic setting section including:

a light source to transmit light through each frame of the photographic film onto a charge coupled device image sensor; and a means for calculating differences between outputs of the charge coupled image sensor and a predetermined set of reference values, the exposure condition being set based on said differences;

the manual setting section including:

a charge coupled video sensor device for receiving the light which is transmitted through each frame of the photographic film;

a video interface for converting outputs of said charge coupled video sensor into a video display; and an input device for making visual adjustments to the video display, the exposure condition being set based on said visual adjustments.

* * * * *